Dec. 4, 1934.   W. H. SAUVAGE   1,983,193
REGULATOR FOR BRAKE RIGGING
Filed June 10, 1929   3 Sheets-Sheet 3
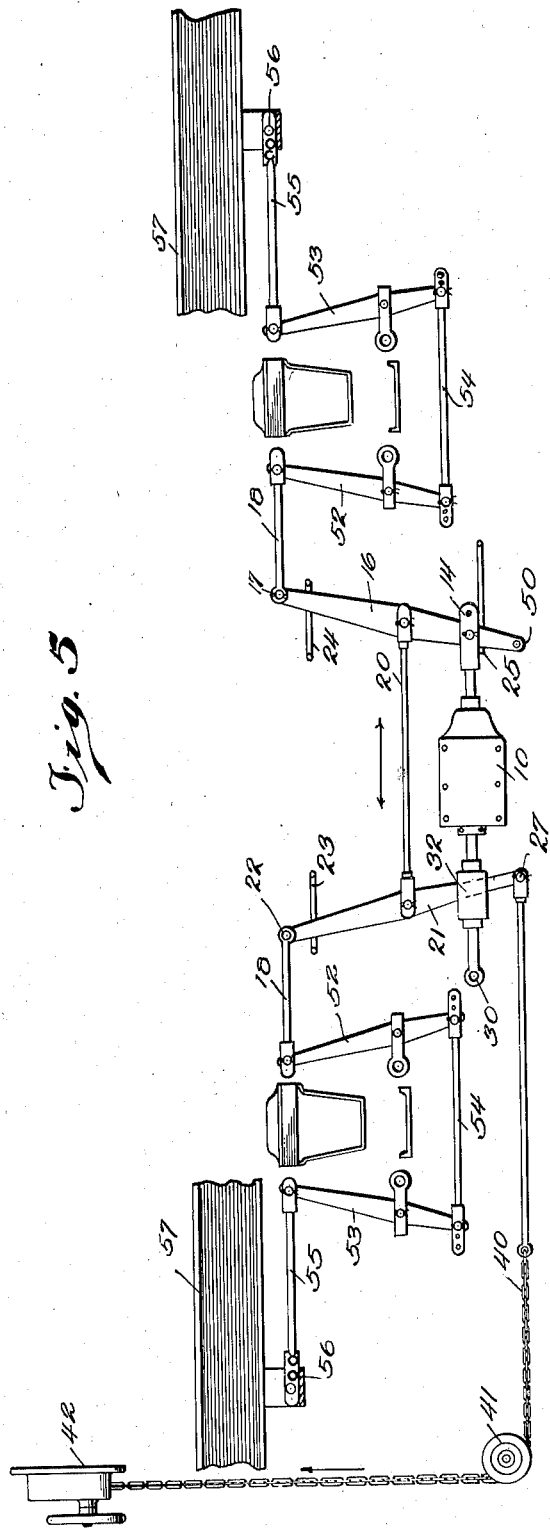
INVENTOR.
W. H. Sauvage
BY
ATTORNEYS Patented Dec. 4, 1934

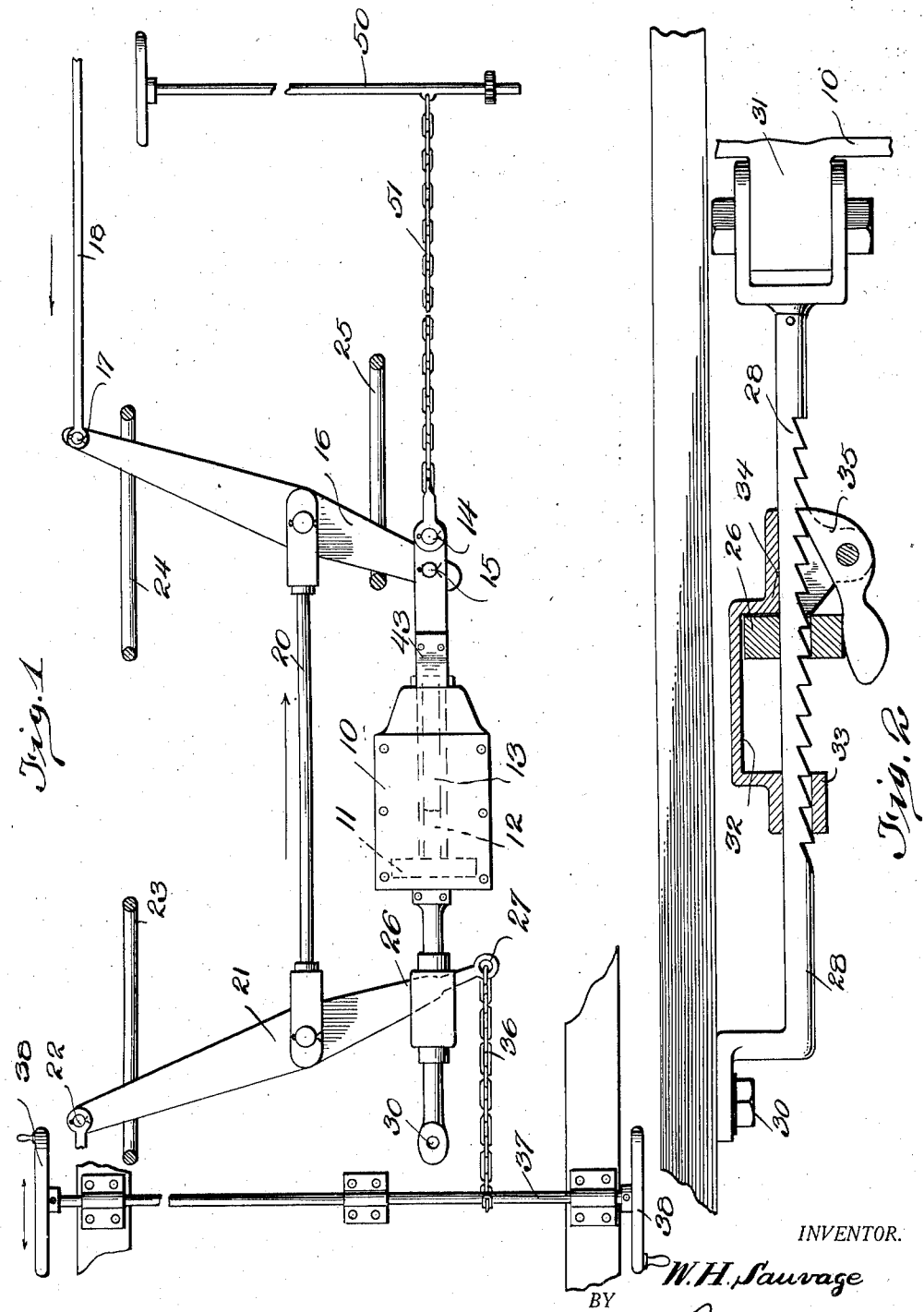

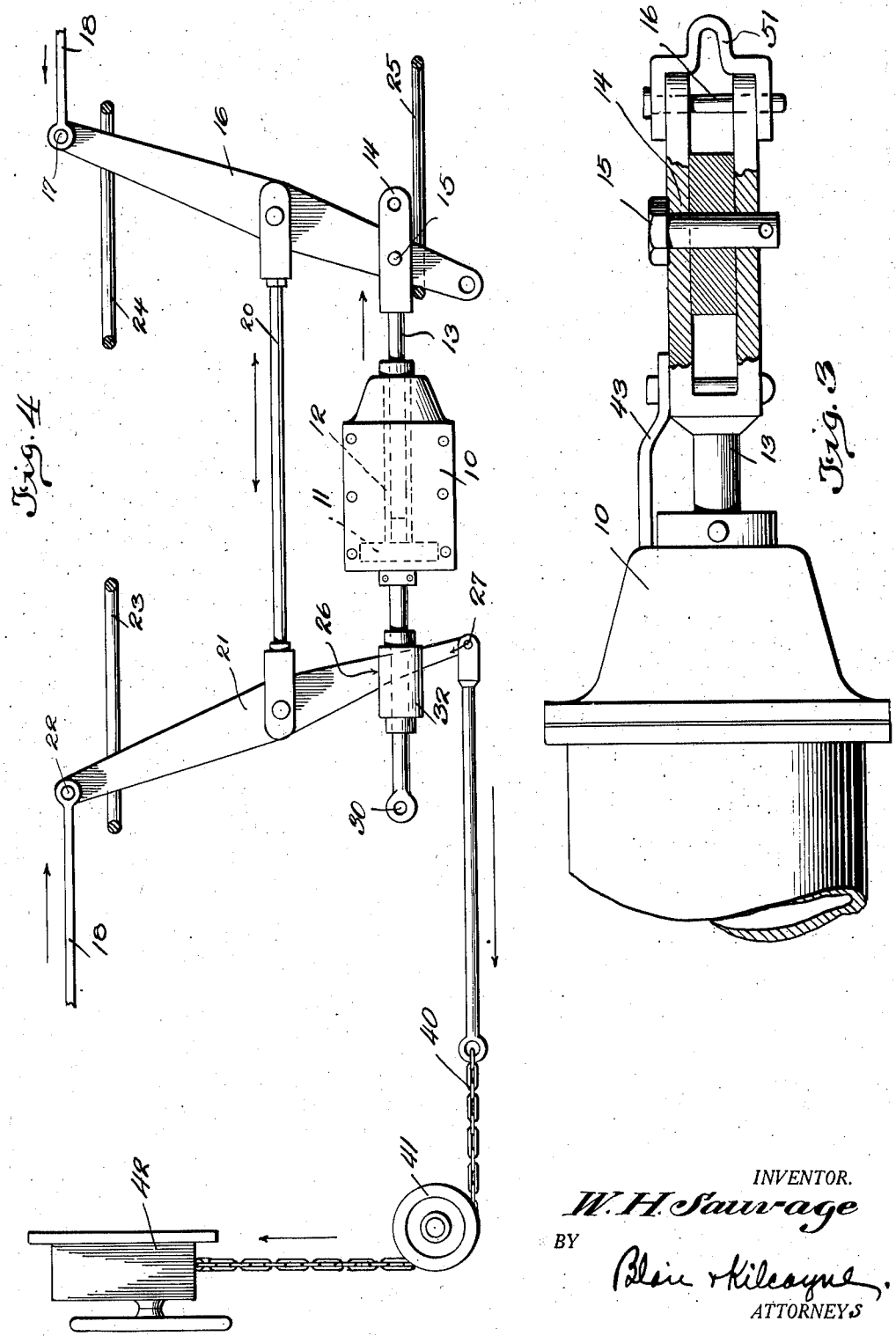

1,983,193

UNITED STATES PATENT OFFICE 1,983,193

REGULATOR FOR BRAKE RIGGING

William H. Sauvage, New York, N. Y., assignor, by mesne assignments, to Royal Railway Improvements Corporation, New York, N. Y., a corporation of Delaware Application June 10, 1929, Serial No. 369,812

5 Claims. (Cl. 188—200)

This invention relates to improvements in regulators for brake riggings, and more particularly to manually actuated brake rigging regulators of the general type illustrated and described in my prior patent, No. 1,681,053, August 14, 1928, as distinguished from automatic slack adjusters heretofore intended and designed for the purpose of taking up excess travel, but which constructions have proven unsatisfactory in commercial and practical operation.

One of the objects of the present invention is to provide an improved manually actuated brake rigging regulator particularly adapted for use in connection with the foundation brake gear, which may be inexpensively manufactured and assembled, and applied to brake rigging now in general use without extensive alteration and substitution of parts.

A further object is to provide a regulator of the above general character particularly adapted for connection with one of the cylinder levers and actuated from a remote point such as at the side or end of the car in an easy and convenient manner, thereby avoiding the necessity of climbing under the cars in order to regulate the brake rigging.

A further object is to provide a practical manually actuated brake rigging regulator of the above character designed to give predetermined and proper brake shoe clearance at all times as well as uniform piston travel.

A further object is to provide a brake regulator of the above general character which will accurately and efficiently determine the brake shoe clearance and piston travel, and hold the rigging locked in adjusted position.

A further object is to provide a regulator of the above character with manually actuated operating means which may be used not only to regulate the brake rigging but may also be used to apply the brakes and hold the same in applied position as, for example, when the car is disconnected from the train and air is not available.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Fig. 1 is a semi-diagrammatic plan view showing such parts of the foundation brake rigging and associated mechanism in partially regulated position as is necessary to understand the invention;

Fig. 2 is a detail view, partly in section, showing the actual take up part of the regulator mechanism;

Fig. 3 is a detail view showing a portion of the cooperating cylinder mechanism;

Fig. 4 is a diagrammatic partial plan and elevational view showing a slight modification of the regulator actuating mechanism;

Fig. 5 is a complete semi-diagrammatic plan view of the brake rigging showing the truck and frame connections.

As is well known to those familiar with this art, manually actuated brake regulators are not to be confused with mechanical automatic slack adjusters heretofore designed and intended to establish proper brake shoe clearance and uniform piston travel. These automatic devices for the most part have been entirely unsatisfactory in commercial operation, due primarily to the variations in forces actuating such automatic slack adjusters on each and every application of the brake. Thus, for example, an emergency application tends to take up not only the normal brake shoe clearance but all of the other lost motions throughout the trucks and brake rigging and center plates, thereby failing to go into full release on release of the air and thus cause dragging brake shoes which produce overheated and cracked wheels and struck brakes due to short piston travel. With a manually actuated regulator, the force is applied during brake rigging adjustment, that is, when the car is standing still, and is substantially constant. Thus, there is always insured predetermined brake shoe clearance and predetermined piston travel, as one necessarily establishes the other.

Referring now to the drawings in detail and particularly to Fig. 1 showing the position of the rigging after several actuations of the regulator, the usual air brake cylinder 10 is secured to the under side of the car body or car frame in any desired manner. This cylinder is provided with a hollow piston 11 and telescopic push rod 12, the forward end 13 of which is provided with a jaw 14 adapted to engage one end 15 of the live lever 16. The opposite end 17 of this cylinder lever 16 is connected by the pull rod 18 with the truck brake rigging at one end of the car as shown in the general plan, Fig. 5.

Intermediate the ends of the lever 16 is a tie rod 20 extending substantially parallel to the piston rod 13 connected to the central part of a dead or floating cylinder lever 21, one end 22 of which is connected with the truck brake rigging at the other end of the car (see Fig. 5). It will be noted that these levers are supported in any desired way as in hangers 23, 24, 25, and the hanger 25 is adapted to limit the return or inward movement of the piston or push rod 13 on release of the air, while stops 23, 24 determine the initial setting of the rigging. The fixed end 26 of the dead cylinder lever 21 is connected with the regulator mechanism shown in Fig. 2, that is, it is provided with a handle portion 27 surrounding a ratchet rod 28 secured to any fixed part of the car frame 30 and the end 31 of the cylinder 10, for example. This ratchet rod carries a cage or housing 32 adapted to embrace ratchet rod 28 at two spaced points 33, 34, and is provided on its under side with a gravity actuated, pivotally mounted and self-locking pawl 35, the nose of which coacts with the teeth of the ratchet 28.

The effective difference in length between one end 33 of the cage or housing 32 and the dead cylinder lever 21 supported by the ratchet bar 28 is equal, or proportional, to entire brake shoe clearance, depending on the leverage ratio. In practice, this distance with standard truck brake rigging is approximately four to five inches.

It will be noted particularly that with the parts shown in Fig. 2, the cylinder lever end 26 is adapted to engage the handle of the dog or pawl 35, thereby to hold the nose of the pawl in firm engagement with the ratchet rod 28. The application force is always in a direction to maintain the parts in the locked position shown. Thus, there is no danger of accidental releasing in use.

When it is desired to regulate the brake rigging, the handle portion 27 of the cylinder lever 26 is moved relatively toward the left, and the lost motion distance existing within the housing between 26 and 33 is absorbed. If any excess travel occurs over and above that normally desired, then the cage 32 with the pawl 35 is moved relatively towards the left, thereby taking up one or more teeth on the pawl and ratchet mechanism. On release of the actuating mechanism, the cylinder levers tend to drop back to the position shown in Fig. 2, giving up the lost motion and thereby re-establishing proper brake shoe clearance and locking the pawl 35 in its holding position.

While there is herein shown a pawl and ratchet mechanism constituting the permanent take up and holding mechanism, it is of course to be understood that other types of holding mechanism well known in this art may be substituted if desired. The pawl and ratchet mechanism is deemed eminently satisfactory after long periods of use, and further it is relatively simple and inexpensive to manufacture.

It will be noted particularly in Fig. 1 that the outer end 27 of the dead cylinder lever is provided with an eye or other attaching member to which one end of a chain 36 is adapted to be connected. The opposite end of this chain is secured to a shaft 37 extending transversely to the car in a manner similar to that shown in my expired patent, No. 909,232. This patented construction failed to insure the objects herein sought due in part to the absence of lost motion devices and stops. This mechanism permits the cylinder lever to be actuated from a remote point such as either side of the car without necessitating anyone going under the car. All that is required is to turn the hand wheel 38 as far as possible in either direction, when it will be known that the brake shoes are brought closely into engagement with the peripheries of the wheel, and all excess travel has been absorbed by the take up and holding means. On release of the hand wheel 38, the parts return to normal position by the gravity action of the truck brake rigging, or the first application of the air brakes will automatically re-establish their normal position of rest.

If desired, any form of holding mechanism may be applied to the shaft upon which the chain is adapted to be wound, and there is illustrated in Fig. 4 a modification in which an actuating chain 40 is connected at one end to the dead cylinder lever 27, while its opposite end after passing about a sheave pulley 41 is connected to a power multiplying device 42 of any desired character mounted upon the end of the car. This mechanism is nothing more than a hand brake, and its manual operation will automatically re-establish an adjustment of the entire brake rigging and also manually apply the brakes upon all of the wheels of both trucks. Thus, as the brakes are manually actuated and applied, the brake rigging is simultaneously adjusted. The form shown in Fig. 1, however, operates identically as the form shown in Fig. 4, and is preferable inasmuch as uniform adjustment is obtained by reason of more uniformity of actuating forces.

By referring to Fig. 3, it will be noted that the jaw 14 at the outer end of the piston rod 13 is provided with rearwardly extending stops 43 adapted to engage one end of the cylinder 10, thereby to limit the inward movement of the exposed telescopic portion 13 of the piston push rod. Thus, the jaw 14 engaging the cylinder lever 16 normally has but approximately a four inch stroke, yet the piston itself moves its normal running travel of seven or eight inches. Thus, the desired piston travel and air expansion within the cylinder 10 is obtained, but the disadvantages of excess leverage movement and insufficient expansion are eliminated, thereby permitting a closer nominal positioning of the brake shoes with respect to the peripheries of the wheels when the brakes are not applied.

It is of course to be understood that in all railway cars hand brakes are required and a conventional form is designated at 50 in Fig. 1 and connected by means of chain 51 to the jaw 14 at the end of the telescoping part 13 of the piston rod. This construction permits in one way the application of the brakes by hand without moving the piston 11.

In Fig. 5, wherein is shown diagrammatically the complete assembly of foundation and truck brake rigging, it will be noted that the levers 16 and 21 are respectively connected to the truck brake rigging at opposite ends of the car. Each of these truck brake riggings includes a live lever 52 and a dead lever 53 connected at their lower end by tie rods 54. The upper ends of the dead levers are each connected by a flexibly mounted link 55 adjustably connected with any fixed point of support 56 on the car frame 57, as distinguished from the heretofore common practice of anchoring these levers to the car truck. It is, of course, to be understood that this type of truck brake rigging is preferably employed with the lay-out shown in either Fig. 1 or Fig. 4.

When a single type of regulator 32 is used, that is, one to each car, the lever guide stops 23 and 24 are necessary only in making the initial foundation brake gear adjustment.

It is a well known fact that when the air brake is properly adjusted in order to function at a predetermined light weight percentage, this percentage should not be exceeded. Assume, for example, that the ordinary efficient hand brake will brake substantially 70% of the light weight of a car when attached to the push rod of the air brake cylinder, which cylinder is also regulated to brake approximately 70% of the light weight of the car. These two brakes working from the same point will produce substantially double the brake power or percentage required and possibly cause slid wheels. With the present invention, however, when the air brake power is applied, the hand brake working in the opposite direction as shown in Figs. 4 and 5 cannot be applied without first releasing the power brake, and vice versa, thus eliminating the danger above mentioned. This construction also has the further advantage that every time the hand brake is operated if any excess travel exists, then the brake rigging will be regulated on each and every application of the hand brake, whereby on application of the power brakes the piston travel will be normal.

From the above, it will be seen that the present invention provides a reliable and efficient mechanism for manually actuating or regulating the entire brake rigging to establish predetermined brake shoe clearance and proper piston travel under all conditions. The mechanism is particularly safe and reliable in that the rigging after being moved to adjusted position remains locked in such position until further adjustment takes place.

Without further analysis, the foregoing will so fully reveal the gist of this invention that others can, by applying current knowledge, readily adapt it for various applications without omitting certain features that, from the standpoint of the prior art, fairly constitute essential characteristics of the generic or specific aspects of this invention and, therefore, such adaptations should and are intended to be comprehended within the meaning and range of equivalency of the following claims.

I claim:
1. A manually actuated regulator for brake rigging comprising a normally fixed ratchet rod, a member embracing said rod at two separated points, a lever cooperating with said rod and mounted between said two points, the effective distance between one point and said lever being proportional to brake shoe clearance, and a pawl cooperating with said ratchet rod normally held in locked position by said lever when the parts are in normal position of rest.

2. A manually actuated regulator for brake rigging comprising a normally fixed ratchet rod, a member embracing said rod at two separated points, a lever cooperating with said rod and mounted between said two points, the effective distance between said lever and one point being proportional to brake shoe clearance, a pawl cooperating with said ratchet rod normally held in locked position by said lever when the parts are in normal position of rest, and means operable from a remote point on the car for unlocking said pawl and ratchet whereby the brake rigging may be regulated.

3. A manually actuated regulator for brake rigging comprising a ratchet rod, a cage mounted upon said ratchet rod and adapted to move relative thereto, a pawl carried by the cage cooperating with the ratchet rod, and a lever within the cage normally holding the pawl in locked relation.

4. A manually actuated regulator for brake rigging comprising a ratchet rod, a cage mounted upon said ratchet rod and adapted to move relative thereto, a pawl carried by the cage cooperating with the ratchet rod, and a lever within the cage normally holding the pawl in locked relation, said cage and lever providing a lost motion movement proportional to brake shoe clearance whereby the brake shoes are brought substantially into engagement with the peripheries of the wheels before the pawl is released from its locked position.

5. A manually actuated regulator for brake rigging comprising a ratchet rod, a cage mounted upon said ratchet rod and adapted to move relative thereto, a pawl carried by the cage cooperating with the ratchet rod, a lever within the cage normally holding the pawl in locked relation, said cage and lever providing a lost motion movement proportional to brake shoe clearance whereby the brake shoes are brought substantially into engagement with the peripheries of the wheels before the pawl is released from its locked position, and hand brake mechanism for actuating said regulator.

WILLIAM H. SAUVAGE.